United States Patent [19]

Oury et al.

[11] Patent Number: 5,699,878
[45] Date of Patent: Dec. 23, 1997

[54] CONVEYOR ELEVATING TECHNIQUES

[75] Inventors: Robert F. Oury, Gilberts; Mark S. Dingeldein, Lombard; Alan S. Ledger, Addison; Joseph P. Gallione, Naperville, all of Ill.

[73] Assignee: Rotec Industries, Elmhurst, Ill.

[21] Appl. No.: 631,935

[22] Filed: Apr. 15, 1996

[51] Int. Cl.⁶ .................................................. B66F 9/22
[52] U.S. Cl. ................................... 187/234; 187/240
[58] Field of Search ............................... 187/203, 222, 187/234, 232, 237, 240, 244; 414/630, 631

[56] References Cited

U.S. PATENT DOCUMENTS

| 4,846,580 | 7/1989 | Oury | 366/27 |
| 5,205,699 | 4/1993 | Habicht | 187/234 |

Primary Examiner—Kenneth Noland
Attorney, Agent, or Firm—Banner & Witcoff, Ltd.

[57] ABSTRACT

Apparatus for raising a conveyor above the surface of a poured concrete structure as the structure is formed includes a post moveable in a vertical direction that supports a conveyor on top of the post. A horizontal support tube is connected to the post, as well as a collar. A jack engages the support and raises the post and collar. A hydraulic means then places a base around the post below the collar so that when the jack is lowered, the conveyor, post and collar are supported by the newly placed base, thereby raising the conveyor relative to the surface of the structure.

13 Claims, 5 Drawing Sheets

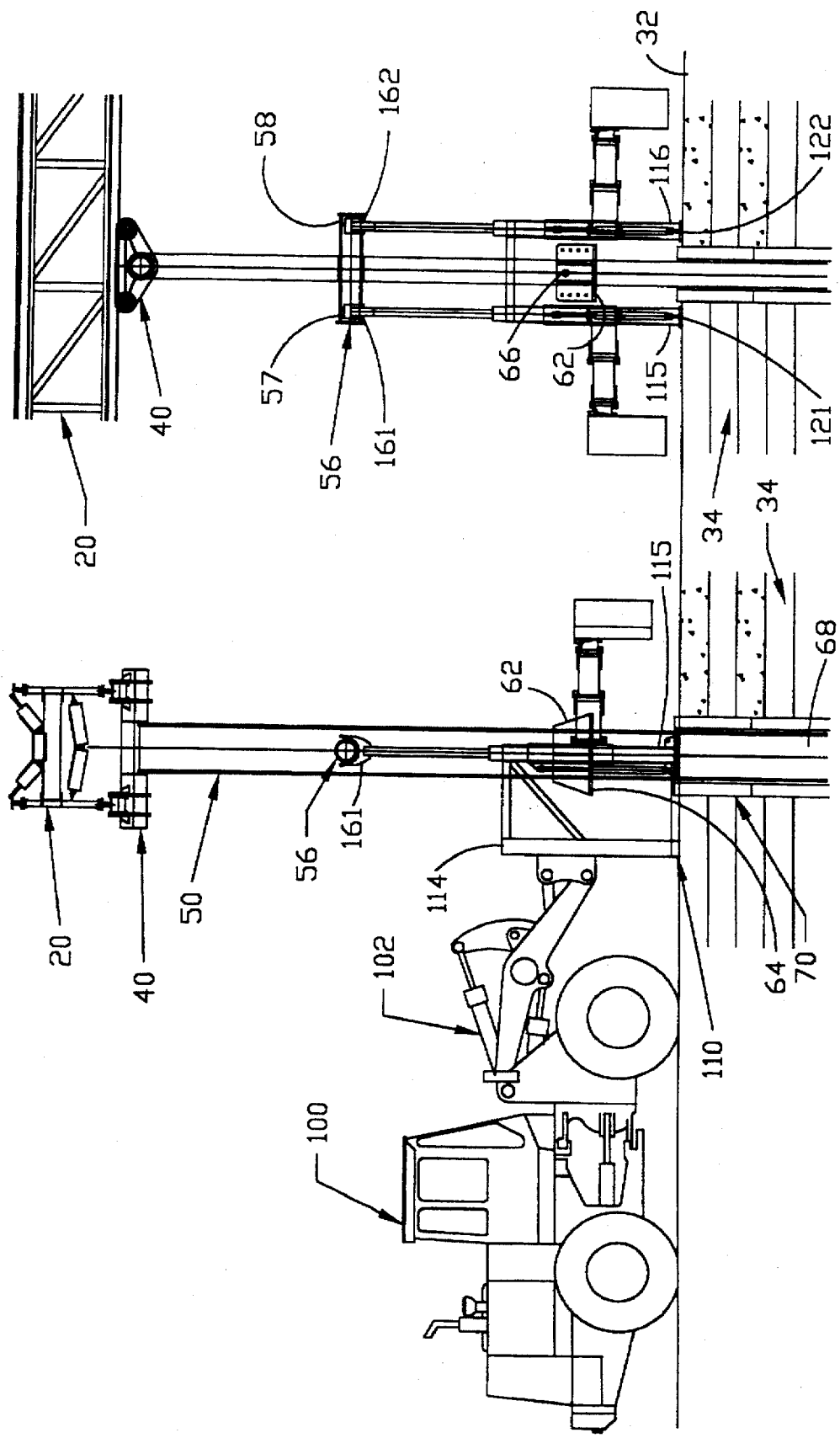

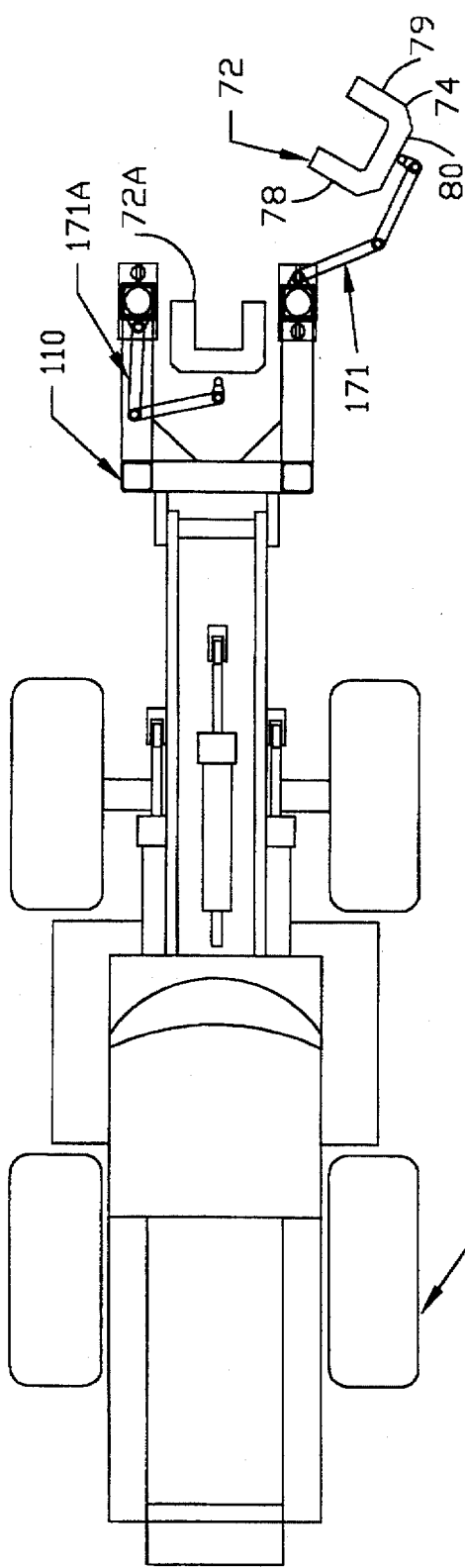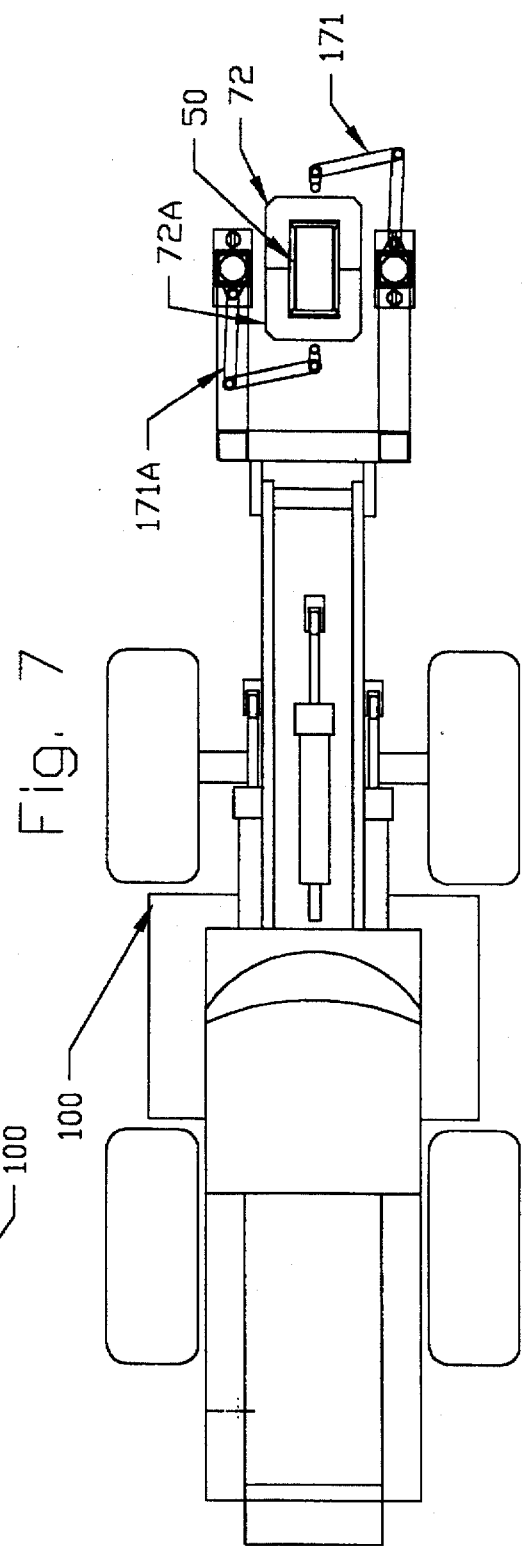

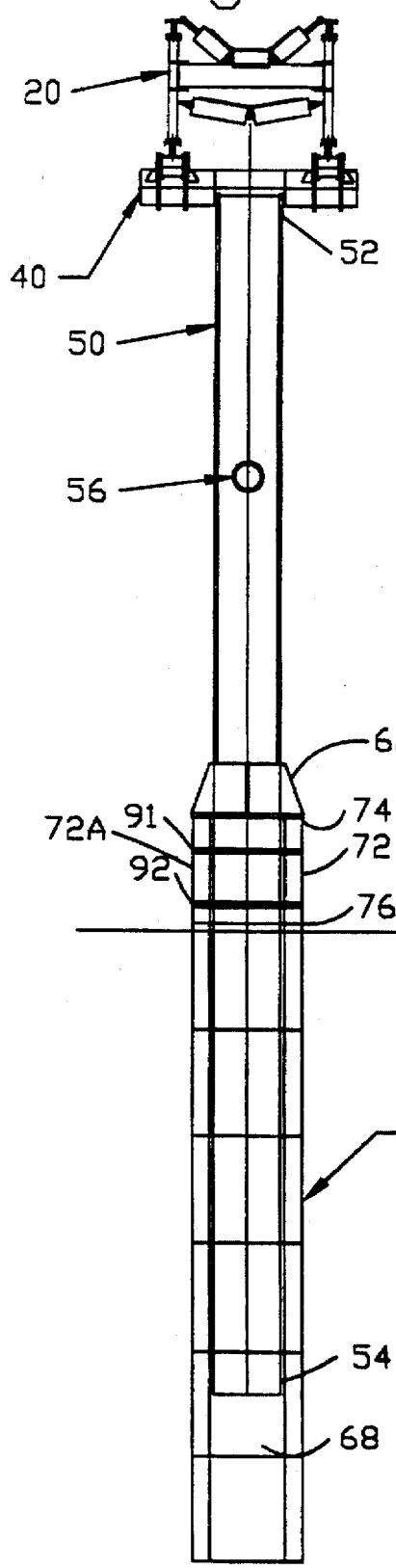
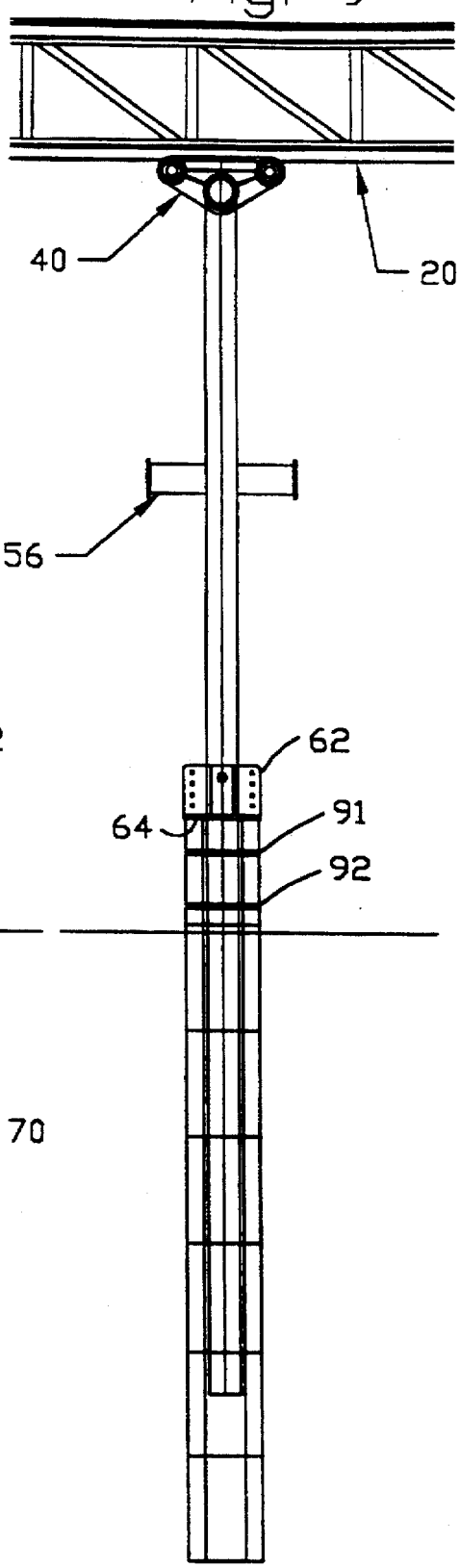

CONVEYOR ELEVATING TECHNIQUES

BACKGROUND OF THE INVENTION

1. Field of the Invention

This invention relates to concrete conveyor systems, and more particularly relates to techniques for elevating such systems above the surface of a poured concrete structure.

2. Description of the Related Art

Concrete or the like is frequently used to from very large structures, such as concrete dams. For the fabrication of a dam by using concrete, a concrete conveyor system typically is supposed over the bedrock on which the dam is to be constructed. As construction progresses, the concrete dam surface rises, thereby creating a need to raise the conveying system which is supplying the concrete.

One system for elevating a conveyor is described in U.S. Pat. No. 4,846,580 (Oury, issued Jul. 11, 1989) (the "'580 Patent"). As shown in FIGS. 5-7 of the '580 Patent, the conveyor system may be raised on a jackpost assembly 162 which includes hydraulic jacks built into a collar surrounding the jackpost. While such an arrangement is an improvement over previous methods, experience has shown that it is time-consuming and difficult to raise a series of jackpost assemblies by the techniques described in the '580 Patent. The present invention improves on the jackpost assembly described in the '580 patent by providing improved efficiency and convenience, thereby saving time on the construction site and lowering the overall cost of construction.

SUMMARY OF THE INVENTION

According to one embodiment, the invention may be used for raising a conveyor above the surface of a poured concrete structure as the structure is formed. In such an environment, the invention preferably includes a post extending into a cavity in the structure so that the post is moveable in a vertical direction. Means are provided for attaching the conveyor to the post. A support, such as a horizontal tube, is attached to the post and can be used for elevating the post. A collar is coupled to the post, preferably below the level of the support. A jack engages the support and raises the post with the collar. While the post and collar are raised, means are provided for placing a base around the post below the collar. After the base is in place, the jack can be used to lower the post so that the collar engages the base. By using the foregoing techniques, the conveyor and post are conveniently raised relative to the surface of the concrete structure.

According to another embodiment, the invention takes the form of an attachment for a self-powered vehicle including a hydraulic lifting system for raising a conveyor supported on a post. The post advantageously may comprise a horizontal cross-bar including a first portion extending on a first side and a second portion extending on a second side of the post opposite the first side. Such an attachment can be used to raise the conveyor above the surface of a poured concrete structure as the structure is formed.

Preferably the attachment includes first and second hydraulic pistons. First and second saddles are attached to the pistons for engaging the first and second portions of the cross-bar. Hydraulic third and fourth pistons are coupled to first and second arms that are used to lift first and second segments of a base into a position around a post. A frame supports the first, second, third and fourth pistons, and means are provided for coupling the pistons to the hydraulic lifting system of the self-propelled vehicle. The frame is attached to the vehicle so that the frame may be moved adjacent the post. Once the frame is adjacent the post, it can be used to elevate the post by engaging the cross-bar with the first and second saddles. While the post is elevated, the first and second segments can be positioned around the post by the first and second arms. Thereafter, when the post is lowered, the collar engages the first and second segments to support the post and conveyor system in an elevated position.

By using the foregoing techniques, a conveyor may be raised above the surface of a poured concrete structure as the structure is formed with a degree of economy, efficiency and convenience unavailable by using prior art techniques.

DESCRIPTION OF THE DRAWINGS

These and other advantages and features of the invention may be understood for purposes of illustration, but not of limitation, in connection with the accompanying drawings wherein like numbers refer to like parts throughout and in which:

FIG. 2 is a side elevational view of the apparatus shown in FIG. 1 with the attachment moved into operative position with respect to the jackpost assembly;

FIG. 3 is a front elevational view of the apparatus illustrated in FIG. 2;

FIG. 6 is a diagrammatic top plan view of the vehicle and attachment shown in FIG. 1 illustrating the manner in which the arm assemblies of the attachment may be moved;

FIG. 7 is a top plan view like FIG. 6 showing another position in which the arm assemblies may be moved;

FIG. 8 is a side elevational view of the jackpost assembly illustrated in FIG. 1 in which the segments of the base lifted into position by the attachment are banded together in preparation for the next elevation of the jackpost assembly; and FIG. 9 is a front elevational view of the apparatus shown in FIG. 8.

DESCRIPTION OF THE PREFERRED EMBODIMENTS

Figure 1:
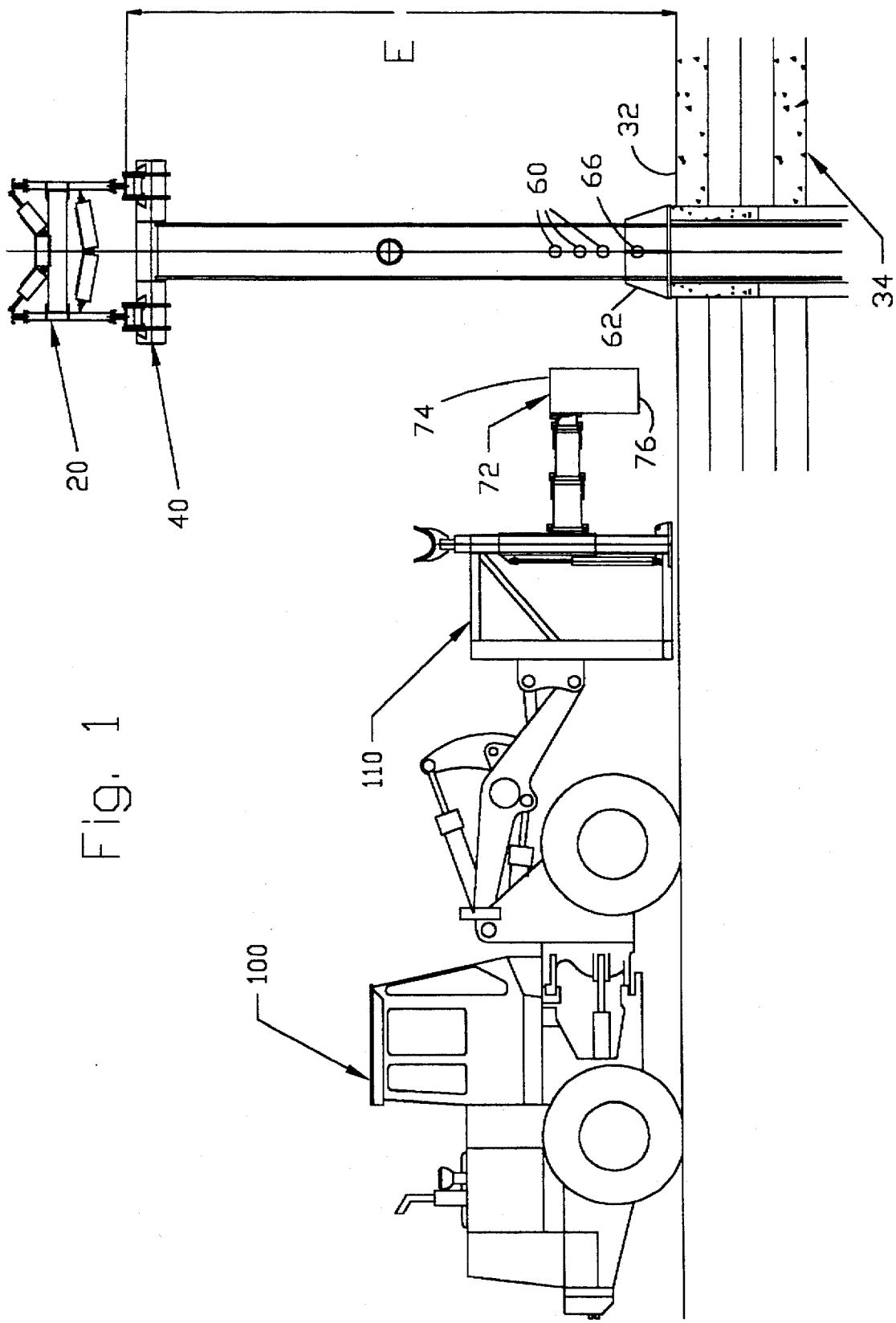
FIG. 1 is a side elevational view of a preferred form of the invention illustrating an attachment for a self-propelled vehicle and a jackpost assembly supporting a conveyor.

Referring to FIGS. 1-3, the preferred embodiments may be used to raise a conveyor system 20 above the surface 32 of a poured concrete structure 34, such as a dam. Conveyor system 20 is attached by means of a conventional rocker arm 40 to a jackpost assembly 50 comprising welded rectangular steel plates. Jackpost 50 can raise conveyor 20 by 23 feet or more above surface 32 (dimension E, FIG. 1).

Jackpost 50 is hollow and includes a top end 52 and a bottom end 54 (FIG. 8). A cylindrical support tube 56 is positioned through corresponding holes in jackpost 50 and includes side portions 57 and 58 that are located on opposite sides of post 50 as shown. Pairs of holes 60 are drilled through jackpost 50 at the locations indicated. A welded steel collar 62 surrounds jackpost 50 and defines a lower surface 64. Collar 62 is rigidly coupled to post 50 by means of a conventional pin 66 that is placed through one of hole pairs 60.

Conveyor 20 is typically elevated by a plurality of jackposts like jackpost 50. The arrangement of hole pairs 60 and collar 62 is an important feature which enables collar 62 to be located at various elevations below conveyor 20 and support tube 56. The ability to couple a collar 62 at various elevations with respect to conveyor 20 is an important feature when the structure 34 has its foundation on uneven ground. In such a situation, collar 62 on one jackpost may need to be located on an elevation with respect to conveyor 20 that is different from the elevation used in connection with other jackposts in order to keep conveyor 20 horizontal.

Still referring to FIGS. 1–3 and 8–9, end 54 of jackpost 50 is movably contained in a cavity 68 of structure 34. Referring to FIGS. 8–9, cavity 68 is formed by a base 70 comprising rectangular segments 72 each having a top edge 74 and a bottom edge 76, as well as sides 78–80 (FIG. 6). A loop 82 (FIGS. 4–5) is cast into each segment. Loop 82 may be a one-inch diameter wire rope, although other styles and types of handles or loops also may be employed. Segments 72 are arranged in pairs so that they surround post 50, thereby enabling the post to move vertically with respect to structure 34.

Referring to FIGS. 1–2, a self-propelled vehicle 100 employing a conventional hydraulic system 102 is used to move and operate an attachment 110. The vehicle may take the form of a John Deere loader.

Referring to FIGS. 1–5, attachment 110 comprises a frame 112 including vertical members 114–117, lower horizontal members 121–123, upper horizontal members 126–128 and braces 132–135 welded together as shown.

Attachment 110 also includes conventional hydraulic cylinders 141–144 that are fitted with conventional hydraulic pistons 151–154, respectively. Referring to FIGS. 2–5, cylinders 141 and 142 are held within vertical members 115 and 116. The upper end of pistons 151 and 152 are fitted with saddles 161 and 162, respectively (FIG. 3).

Figure 5:
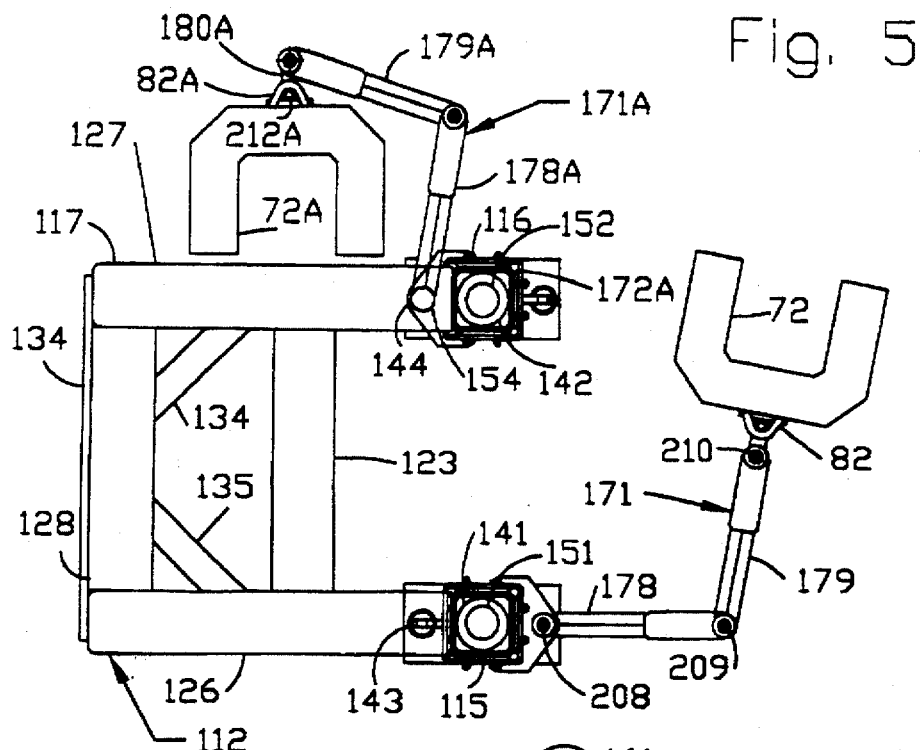
FIG. 5 is a top plan view of the apparatus shown in FIG. 4 with the arm assemblies moved relative to the position shown in FIG. 4 and with the saddles removed.
Figure 4:
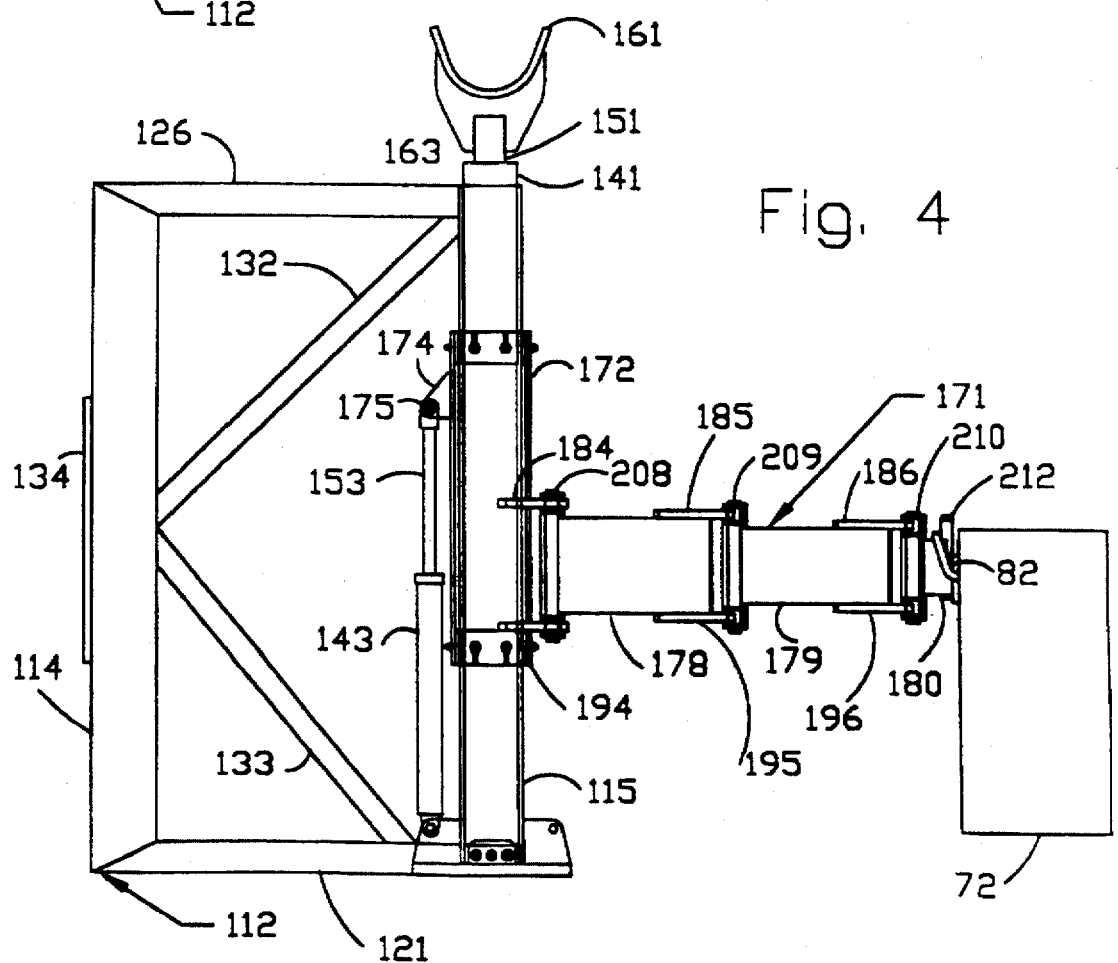
FIG. 4 is a side elevational view of a preferred form of the attachment shown in FIG. 1 with arm assemblies in extended positions.

Referring to FIGS. 4–5, attachment 110 also includes identical arm assemblies 171 and 171A. Assembly 171A can be understood from the following description of assembly 171 which includes a guide member 172 that is guided by and placed around frame member 115. A similar guide member 172A is placed around frame member 116. A bracket 174 and a pin 175 are used to attach piston 153 to guide member 172. Cantilevered sections 178–180 are used to support base segment 72. The sections include upper hinge plates 184–186 and lower hinge plates 194–196. The sections are rotatable about vertical axes by means of vertical hinges 208–210. A pickup finger 212 is located on section 180 and is used to engage loop 82 of segment 72. A similar finger 212A on section 180A is used to engage a loop 82A of another base segment 72A.

Operation of the preferred embodiments will be described in connection with FIGS. 1–3 and 6–9. When surface 32 reaches the top of the base segment embedded within structure 34 (FIG. 1), vehicle 100 with attachment 110 is used to pick up a pair of base segments 72 and 72A. In order to pick up the segments, guide members 172 and 172A are moved to their lowest positions so that loops 82 and 82A are placed directly above fingers 212 and 212A. Guide members 172 and 172A then are raised by operating pistons 153 and 154 so that fingers 212 and 212A engage loops 82 and 82A, respectively. Attachment 110 is then moved to the position shown in FIGS. 2 and 3 and pistons 151 and 152 are raised so that saddles 161 and 162 engage sections 57 and 58 of tube 56 as shown. Jackpost assembly 50 with attached conveyor 20 then is raised to the position shown in FIGS. 2 and 3. As a result, collar 62 also is raised to a position sufficiently high above surface 32 so that base segments 72 and 72A can be placed under collar 62 and above the existing base segments embedded in structure 34. Arm assemblies 171 and 171A are rotated as shown in FIGS. 6 and 7 until base segments 72 and 72A surround jackpost 50 (FIG. 7).

Referring to FIGS. 8 and 9, segments 72 and 72A are wrapped with bands 91 and 92 in order to provide a firm base for collar 62 and jackpost assembly 50. Thereafter, pistons 151 and 152 are lowered so that surface 64 of collar 62 engages top surface 74 of blocks 72 and 72A (FIGS. 8–9). As a result of the foregoing operation, conveyor system 20 and jackpost assembly 50 are both raised to a higher elevation so that additional concrete may be poured on surface 32 to continue the construction of structure 34.

Those skilled in the art will recognize that embodiments described above may be altered and modified without departing from the true spirit and scope of the invention as defined in the accompanying claims.

We claim:

1. Apparatus for raising a conveyor above the surface of a poured concrete structure as the structure is formed comprising in combination:

a post extending into a cavity in said structure so that said post is moveable in a vertical direction;

means for attaching said conveyor to said post;

a support attached to said post for raising said post;

a collar coupled to said post;

a jack for engaging said support and raising said post with said collar; and means for placing a base around said post below said collar, whereby said collar engages said base when said jack lowers said support so that said conveyor and said post are held in an elevated position relative to said surface of said structure.

2. Apparatus, as claimed in claim 1, wherein said cavity in said structure is formed by a plurality of bases like said base, said plurality of bases being imbedded in said structure.

3. Apparatus, as claimed in claim 1, wherein said post defines a plurality of holes arranged vertically along said post and wherein said collar is pinned to at least one of said holes.

4. Apparatus, as claimed in claim 1, wherein said jack and said means for placing comprise an attachment for a self propelled vehicle including a hydraulic lifting system.

5. Apparatus, as claimed in claim 4, wherein said support comprises a horizontal cross tube including a first portion extending on a first side of said post and a second portion extending on a second side of said post opposite said first side, wherein said base comprises a first segment and a second segment.

6. Apparatus, as claimed in claim 5, wherein said jack comprises:

a hydraulic first piston;

a first saddle attached to said first piston for engaging said first portion of said cross bar;

a hydraulic second piston;

a second saddle attached to said second piston for engaging said second portion of said cross bar;

a hydraulic third piston;

a hinged first arm coupled to said third piston for lifting said first segment of said base;

a hydraulic fourth piston;

a hinged second arm coupled to said fourth piston for lifting said second segment of said base;

a frame for supporting said first piston, second piston, third piston and fourth piston; and means for coupling said first piston, second piston, third piston and fourth piston to said hydraulic lifting system of said self propelled vehicle and for attaching said frame to said vehicle so that said frame can be moved adjacent said post, said post can be elevated by said first and second saddles, said first and second segments can be positioned around said post by said first and second arms, and said post can be lowered whereby said collar engages said first and second segments to support said post and conveyor system in an elevated position.

7. Apparatus, as claimed in claim 6, wherein said first and second hinged arms each comprises:

a guide member guided by said frame;

a first section cantilevered from said member and supported on a first hinge;

a second section cantilevered on said first section and supported on a second hinge;

a third section cantilevered on said second section and supported on a third hinge; and pickup means attached to said third section for engaging one of said first and second segments of said base, whereby said segment can be elevated and manually maneuvered into position adjacent said post.

8. Apparatus, as claimed in claim 7, wherein said first and second segments each comprise a loop cast in said segment and wherein said pickup means comprises a finger for engaging said loop.

9. Apparatus, as claimed in claim 7, wherein said frame comprises a vertical first member supporting said first piston and a vertical second member supporting said second piston and wherein said guide member is located around one of said first and second members of said frame.

10. An attachment for a self powered vehicle including a hydraulic lifting system for raising a conveyor supported on a post comprising a horizontal cross bar including a first portion extending on a first side of said post and a second portion extending on a second side of said post opposite said first side, said conveyor being raised above the surface of a poured concrete structure as the structure is formed, said attachment comprising in combination:

a hydraulic first piston;

a first saddle attached to said first piston for engaging said first portion of said cross bar;

a hydraulic second piston;

a second saddle attached to said second piston for engaging said second portion of said cross bar;

a hydraulic third piston;

a hinged first arm coupled to said third piston for lifting a first segment of a base;

a hydraulic fourth piston;

a hinged second arm coupled to said fourth piston for lifting a second segment of said base;

a frame for supporting said first piston, second piston, third piston and fourth piston; and means for coupling said first piston, second piston, third piston and fourth piston to said hydraulic lifting system of said self propelled vehicle and for attaching said frame to said vehicle so that said frame can be moved adjacent said post, said post can be elevated by said first and second saddles, said first and second segments can be positioned around said post by said first and second arms, and said post can be lowered whereby a collar coupled to said post engages said first and second segments to support said post and conveyor system in an elevated position.

11. An attachment, as claimed in claim 10, wherein said first and second hinged arms each comprises:

a guide member guided by said frame;

a first section cantilevered from said member and supported on a first hinge;

a second section cantilevered on said first section and supported on a second hinge;

a third section cantilevered on said second section and supported on a third hinge; and pickup means attached to said third section for engaging one of said first and second segments of said base, whereby said segment can be elevated and manually maneuvered into position adjacent said post.

12. Apparatus, as claimed in claim 11, wherein said first and second segments each comprise a loop cast in said segment and wherein said pickup means comprises a finger for engaging said loop.

13. Apparatus, as claimed in claim 11, wherein said frame comprises a vertical first member supporting said first piston and a vertical second member supporting said second piston and wherein said guide member is located around one of said first and second members of said frame.

* * * * *